US012769564B2

(12) United States Patent
Sun et al.

(10) Patent No.: US 12,769,564 B2
(45) Date of Patent: Oct. 20, 2026

(54) SERVER BOOTING CONTROL METHOD AND APPARATUS, AND SERVER

(71) Applicant: SUZHOU METABRAIN INTELLIGENT TECHNOLOGY CO., LTD., Suzhou (CN)

(72) Inventors: Xiuqiang Sun, Suzhou (CN); Baojun Liu, Suzhou (CN); Jintao Guo, Suzhou (CN); Shanbin Ai, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/142,931

(22) PCT Filed: May 22, 2024

(86) PCT No.: PCT/CN2024/094785

§ 371 (c)(1),
(2) Date: Jun. 24, 2025

(87) PCT Pub. No.: WO2025/138551

PCT Pub. Date: Jul. 3, 2025

(65) Prior Publication Data

US 2026/0119200 A1 Apr. 30, 2026

(30) Foreign Application Priority Data

Dec. 28, 2023 (CN) ........................ 202311839055.7

(51) Int. Cl.
*G06F 15/177* (2006.01)
*G06F 9/00* (2018.01)
*G06F 9/445* (2018.01)

(52) U.S. Cl.
CPC ................................ *G06F 9/44505* (2013.01)

(58) Field of Classification Search
CPC .................................................. G06F 9/44505
See application file for complete search history.

(56) References Cited

U.S. PATENT DOCUMENTS

2009/0089571 A1* 4/2009 Fu ........................ G06F 9/4405 713/2
2014/0122746 A1* 5/2014 Shaver .................... G06F 1/182 710/10

(Continued)

FOREIGN PATENT DOCUMENTS

CN 106055361 A 10/2016
CN 106598564 A 4/2017

(Continued)

*Primary Examiner* — Xuxing Chen
(74) *Attorney, Agent, or Firm* — IPro, PLLC

(57) ABSTRACT

A server booting control method and apparatus, and a server are provided by embodiments of the present application. The server booting control method includes: determining N first signals of a motherboard in a server booting process, wherein N is a natural number greater than 1; determining a plurality of pieces of motherboard configuration information by employing the N first signals in response to N being greater than or equal to a first preset threshold; determining target motherboard configuration information that is matched with a target customer requirement from the plurality of pieces of motherboard configuration information, wherein the target customer requirement is configured for representing a configuration requirement of a target customer for the motherboard; and loading basic input/output system (BIOS) parameters based on the target motherboard configuration information, to configure server operation according to the BIOS parameters.

20 Claims, 8 Drawing Sheets

(56) References Cited

U.S. PATENT DOCUMENTS

| | | | | |
|---|---|---|---|---|
| 2016/0316043 | A1 | 10/2016 | Kochar et al. | |
| 2021/0208897 | A1* | 7/2021 | Chen | G06F 13/4068 |
| 2023/0334155 | A1* | 10/2023 | Zhang | G06F 21/572 |
| 2023/0334184 | A1* | 10/2023 | Zhang | G06F 21/83 |

FOREIGN PATENT DOCUMENTS

| | | | |
|---|---|---|---|
| CN | 111124505 | A | 5/2020 |
| CN | 115658113 | A | 1/2023 |
| CN | 117519836 | A | 2/2024 |

* cited by examiner

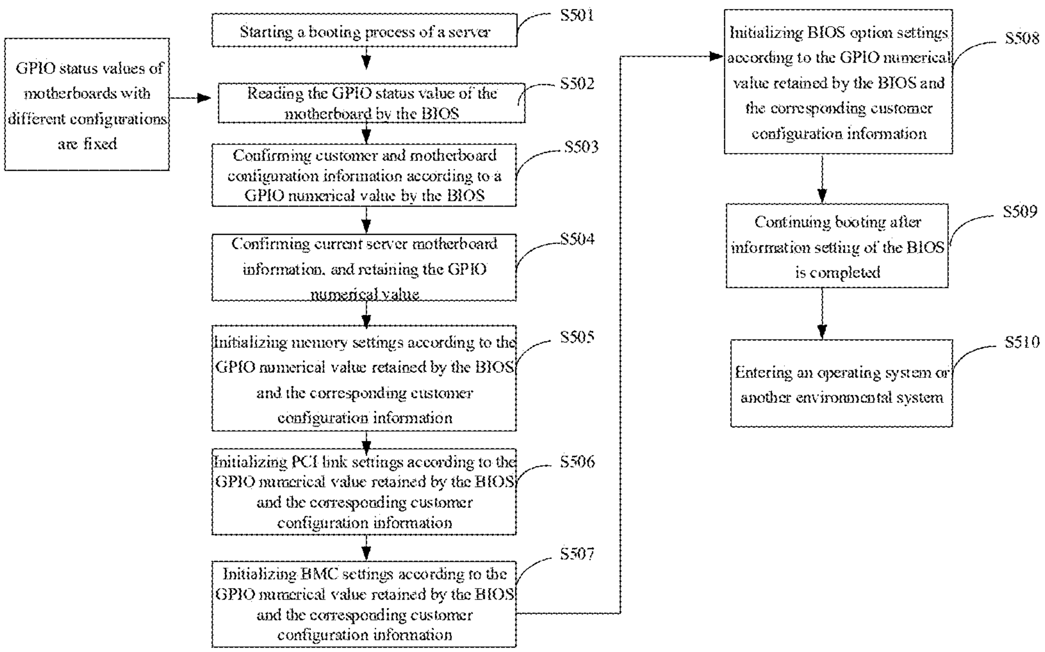

FIG. 5

| GPIO number | Status value | | | | | | | | Customer |
|---|---|---|---|---|---|---|---|---|---|
| GPIO0 | 0 | 0 | 0 | 0 | 0 | 0 | 0 | 0 | Customer A |
| GPIO1 | 0 | 0 | 0 | 0 | 1 | 1 | 1 | 1 | |
| GPIO2 | 0 | 0 | 1 | 1 | 0 | 0 | 1 | 1 | |
| GPIO3 | 0 | 1 | 0 | 1 | 0 | 1 | 0 | 1 | |
| Configuration information | Configuration 1 | Configuration 2 | Configuration 3 | Configuration 4 | Configuration 5 | Configuration 6 | Configuration 7 | Configuration 8 | |

FIG. 6A

| GPIO number | Status value | | | | | | | | Customer |
|---|---|---|---|---|---|---|---|---|---|
| GPIO0 | 1 | 1 | 1 | 1 | 1 | 1 | 1 | 1 | Customer A |
| GPIO1 | 0 | 0 | 0 | 0 | 1 | 1 | 1 | 1 | |
| GPIO2 | 0 | 0 | 1 | 1 | 0 | 0 | 1 | 1 | |
| GPIO3 | 0 | 1 | 0 | 1 | 0 | 1 | 0 | 1 | |
| Configuration information | Configuration 1 | Configuration 2 | Configuration 3 | Configuration 4 | Configuration 5 | Configuration 6 | Configuration 7 | Configuration 8 | |

FIG. 6B

| | Customer | Device | BIOS |
|---|---|---|---|
| FRU | NA | NA | Default |
| | Customer A | NA | Customer A |
| | Customer A | Configuration 1 | Customer A Configuration 1 |
| | NA | Configuration 2 | Default |
| | Customer B | NA | Customer B |
| | Customer B | Configuration 2 | Customer B Configuration 2 |

SERVER BOOTING CONTROL METHOD AND APPARATUS, AND SERVER

CROSS-REFERENCE TO RELATED APPLICATION

This application claims the priority of the Chinese Patent application filed on Dec. 28, 2023 before the China National Intellectual Property Administration with the application number of 202311839055.7, and the title of "SERVER BOOTING CONTROL METHOD AND APPARATUS, AND SERVER", which is incorporated herein in its entirety by reference.

FIELD

Embodiments of the present application relate to the field of computers and, more particularly, to a server booting control method and apparatus, and a server.

BACKGROUND

At present, when a server product is produced, a plurality of products may be designed based on a processor, because the same type of processor may be developed and set in different configurations for different service requirements of different customers, to meet different service requirements of an ultimate customer. If a type of a server chip needs to meet requirements of a general-purpose server, and also needs to support a storage-type server and a graphics processing unit (GPU) computing-type server, the server chip needs customized development for each server, which may greatly increase the firmware research and development cost.

SUMMARY

A server booting control method and apparatus, and a server are provided by an embodiment of the present application to at least solve the problems of high configuration cost for customer requirements and poor server availability in the related art.

According to an embodiment of the present application, a server booting control method is provided, which is applied to a basic input/output system (BIOS), the BIOS is disposed in a motherboard of a server, and the server booting control method includes: determining N first signals of the motherboard in a server booting process, wherein the N first signals are configured for identifying the motherboard, and N is a natural number greater than 1; determining a plurality of pieces of motherboard configuration information by employing the N first signals in response to N being greater than or equal to a first preset threshold; determining target motherboard configuration information that is matched with a target customer requirement from the plurality of pieces of motherboard configuration information, wherein the target customer requirement is configured for representing a configuration requirement of a target customer for the motherboard; and loading basic input/output system (BIOS) parameters based on the target motherboard configuration information, to configure server operation according to the BIOS parameters.

According to another embodiment of the present application, a server booting control apparatus is provided, which is applied to a BIOS, the BIOS is disposed in a motherboard of a server, and the server booting control apparatus includes: a first determination module, configured to determine N first signals of the motherboard in a server booting process, wherein the N first signals are configured for identifying the motherboard, and N is a natural number greater than 1; a second determination module, configured to determine a plurality of pieces of motherboard configuration information by employing the N first signals in response to N being greater than or equal to a first preset threshold; a third determination module, configured to determine target motherboard configuration information that is matched with a target customer requirement from the plurality of pieces of motherboard configuration information, wherein the target customer requirement is configured for representing a configuration requirement of a target customer for the motherboard; and a first loading module, configured to load BIOS parameters based on the target motherboard configuration information, to configure server operation according to the BIOS parameters.

In an exemplary embodiment, the second determination module includes: a first reading unit, configured to read a status value of each of the N first signals via a baseboard management controller (BMC); and a first combination unit, configured to randomly combine status values of the N first signals to obtain the plurality of pieces of motherboard configuration information, wherein each piece of the plurality of pieces of motherboard configuration information at least includes a combination of status values of M first signals, the combination of the status values of the M first signals is a hexadecimal numerical value, M is a natural number less than or equal to N, and M is greater than or equal to a second preset threshold.

In an exemplary embodiment, the apparatus further includes: a first storage module, configured to store the target motherboard configuration information into a variable in the BIOS before the BIOS parameters are loaded based on the target motherboard configuration information to configure server operation according to the BIOS parameters.

In an exemplary embodiment, the first loading module includes: a first determination unit, configured to determine status values of the M first signals included in the target motherboard configuration information in response to the server being in an initialization phase, wherein a combination of the status values of the M first signals is the hexadecimal numerical value, M is a natural number less than or equal to N, and M is greater than or equal to the second preset threshold; a first loading unit, configured to load the BIOS parameters based on the status values of the M first signals and the target customer requirement; and a first operation unit, configured to perform an initialization operation on devices in the server by employing the BIOS parameters.

In an exemplary embodiment, the initialization operation includes at least one of initializing variable information of a memory, initializing variable information of a peripheral component interconnect (PCI) link, initializing variable information of a BMC, and initializing option variable information of the BIOS.

In an exemplary embodiment, the apparatus further includes: a second reading unit, configured to, after the determining the N first signals of the motherboard in the server booting process, read field replaceable unit (FRU) information from the BMC based on an intelligent platform management interface (IPMI) protocol in response to N being less than the first preset threshold, or abnormality occurring in reading the N first signals, wherein the FRU information includes information of the target customer and/or device information in the server; and a first configuration unit, configured to load the BIOS parameters based on the FRU information, to configure the server operation according to the BIOS parameters.

In an exemplary embodiment, the first configuration unit includes: a first determination sub-unit, configured to determine first motherboard configuration information corresponding to the information of the target customer in response to the FRU information including the information of the target customer; and a first loading sub-unit, configured to load the BIOS parameters based on the first motherboard configuration information, to configure the server operation according to the BIOS parameters.

In an exemplary embodiment, the first configuration unit includes: a second determination sub-unit, configured to determine second motherboard configuration information corresponding to the information of the target customer in response to the FRU information including the information of the target customer and the device information in the server; and a second loading sub-unit, configured to load the BIOS parameters based on the second motherboard configuration information, to configure the server operation according to the BIOS parameters.

In an exemplary embodiment, the first configuration unit includes: a third determination sub-unit, configured to determine third motherboard configuration information corresponding to the information of the target customer in response to the FRU information including the device information in the server, or the FRU information is null, wherein the third motherboard configuration information is a set default parameter in response to the BIOS being booted; and a third loading sub-unit, configured to load the BIOS parameters based on the third motherboard configuration information, to configure the server operation according to the BIOS parameters.

In an exemplary embodiment, the apparatus further includes: a first setting module, configured to, after the determining the N first signals of the motherboard in the server booting process, set an expansion chip through a bus disposed in the motherboard in response to N being less than the first preset threshold, or abnormality occurring in reading the N first signals; a first generation module, configured to generate the N first signals via the expansion chip; and a first reading module, configured to read the status value of each of the N first signals from a BMC through an IPMI protocol, wherein the BMC is configured to assign the status value of each of the N first signals to a corresponding variable in the BMC.

In an exemplary embodiment, the apparatus further includes: a second reading module, configured to, after the acquiring the status value of each of the N first signals by the BMC, and assigning the status value of each of the N first signals to the corresponding variable in the BMC, read the status value of each of the N first signals from the BMC through a bus protocol; and a first combination module, configured to randomly combine status values of the N first signals to obtain the plurality of pieces of motherboard configuration information, wherein each piece of the plurality of pieces of motherboard configuration information at least includes a combination of status values of M first signals, the combination of the status values of the M first signals is a hexadecimal numerical value, M is a natural number less than or equal to N, and M is greater than or equal to a second preset threshold.

In an exemplary embodiment, the apparatus further includes: a second setting module, configured to set the status value of each of the first signals as a preset status value in response to abnormality occurring in acquiring the status value of each of the first signals by the BMC after the N first signals are generated by the expansion chip; and a fourth determination module, configured to determine the target motherboard configuration information according to the preset status value.

In an exemplary embodiment, the apparatus further includes: a first triggering module, configured to trigger the server to enter an operating system or another environmental system after the BIOS parameters are loaded based on the target motherboard configuration information to configure the server operation according to the BIOS parameters.

A server is further provided by another embodiment of the present application, which includes a BIOS and a motherboard, wherein the BIOS is configured to implement the steps of the server booting control method stated above; the motherboard includes a plurality of processors, each of the plurality of processors includes N signal devices, the N signal devices are configured to generate the N first signals, the plurality of processors are connected through an interconnection bus, and the plurality of processors are connected to the BIOS through a protocol bus.

In an exemplary embodiment, the server further includes a BMC, wherein the BMC is configured to read a status value of each of the N first signals in response to N being greater than or equal to a first preset threshold and transmit the status value of each of the N first signals to the BIOS; or the BMC is configured to transmit FRU information to the BIOS through an IPMI protocol in response to N being less than the first preset threshold or abnormality occurring in reading the N first signals by the BIOS.

In an exemplary embodiment, the server further includes an expansion chip, wherein the expansion chip is configured to generate the N first signals, wherein the expansion chip is a chip set through a bus disposed in the motherboard in response to N being less than the first preset threshold, or abnormality occurring in reading the N first signals, and the expansion chip is connected to the plurality of processors through an inter-integrated circuit (I2C) bus.

In an exemplary embodiment, a status value of each of the N first signals is acquired by a BMC, the status value of each of the N first signals is assigned by the BMC to a corresponding variable in the BMC, and the BIOS reads the status value of each of the N first signals from the BMC through an IPMI protocol.

A computer non-transitory readable storage medium is further provided by an embodiment of the present application, wherein the computer non-transitory readable storage medium stores a computer program stored therein.

An electronic device is further provided by an embodiment of the present application, which includes at least one processor; and a memory, wherein the memory stores computer instructions capable of running on the at least one processor, and the instructions, in response to being executed by the at least one processor, implement the steps of the server booting control method stated above.

A computer program product is further provided by an embodiment of the present application, which includes a computer program, wherein the computer program, in response to being executed by a processor, implements the steps of the server booting control method stated above.

According to the present application, since the BIOS determines the N first signals of the motherboard in the server booting process, the plurality of pieces of motherboard configuration information are determined by employing the N first signals in response to the N first signals meeting a certain number, the target motherboard configuration information that is matched with the target customer requirement is determined from the plurality of pieces of motherboard configuration information, and the BIOS parameters are loaded according to the target motherboard configuration information, to configure the server operation according to the BIOS parameters. Consequently, the adaptation of the server may be performed in a firmware manner in combination with the exclusive identification information of the motherboard, it is unnecessary to separately perform customized development for each server, and that the mirroring of one BIOS supports the booting and application of different types of servers with different processors may be satisfied, thereby the server availability is improved.

BRIEF DESCRIPTION OF THE DRAWINGS

In order to describe the technical solutions of the embodiments of the present application or the related art more clearly, the drawings required to be used in the description of the embodiments or the related art are introduced briefly below. Apparently, the drawings in the following description show only some embodiments of the present application, and a person skilled in the art may still derive other embodiments according to these accompanying drawings without paying any creative efforts.

FIG. 5 is a flowchart of an interaction among devices disposed in a server motherboard according to an embodiment of the present application;

FIG. 6A is a schematic diagram of configuration information according to an embodiment of the present application;

FIG. 6B is another schematic diagram of configuration information according to an embodiment of the present application;

DETAILED DESCRIPTION

Embodiments of the present application are described in detail below with reference to the drawings and in combination with the embodiments.

It should be noted that terms “first”, “second” and the like in the specification and claims of the present application and the above drawings are used for distinguishing similar objects, and are not necessarily used for describing an order or a sequence.

Figure 1:
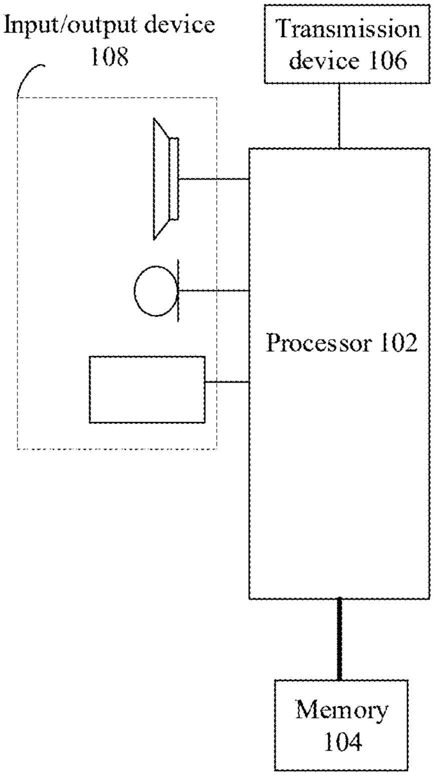
FIG. 1 is a block diagram of a hardware structure of a mobile terminal of a server booting control method according to an embodiment of the present application.

The method embodiments provided in the embodiments of the present application may be executed in a mobile terminal, a computer terminal, or a similar computing apparatus. Taking an operation in the mobile terminal as an example, FIG. 1 is a block diagram of a hardware structure of a mobile terminal of a server booting control method according to an embodiment of the present application. As shown in FIG. 1, a mobile terminal may include one or more (only one is shown in FIG. 1) processors 102 (the processor 102 may include, but is not limited to a processing apparatus such as a microcontroller unit (MCU) or a field programmable gate array (FPGA)) and a memory 104 configured to store data, wherein the mobile terminal may further include a transmission device 106 configured with a communication function and an input/output device 108. A person skilled in the art may understand that the structure shown in FIG. 1 is only schematic, and does not limit the structure of the above mobile terminal. For example, the mobile terminal may also include more or fewer components than the components shown in FIG. 1, or may have different configurations from the configuration shown in FIG. 1.

The memory 104 may be configured to store a computer program, such as a software program and module of application software, such as a computer program corresponding to a server booting control method in the embodiment of the present application, and the processor 102 executes various functional applications and data processing, i.e., implementing the above method by running the computer program stored in the memory 104. The memory 104 may include a high-speed random memory, and may further include a non-transitory memory, such as one or more magnetic storage apparatuses, a flash memory, or another non-transitory solid-state memory. In some embodiments, the memory 104 may further include memories remotely disposed relative to the processor 102, and the remote memories may be connected to the mobile terminal through a network. Examples of the network include, but are not limited to the Internet, Intranets, local area networks (LANs), mobile communication networks, and combinations thereof.

A transmission device 106 is configured to receive or transmit data via a network. An example of the above network may include a wireless network provided by a communication provider of the mobile terminal. In an example, the transmission device 106 includes a network interface controller (NIC), which may be connected to other network devices through a base station, so that the transmission device may be communicated with the Internet. In an example, the transmission device 106 may be a radio frequency (RF) module, which is configured to communicate with the Internet in a wireless way.

Figure 2:
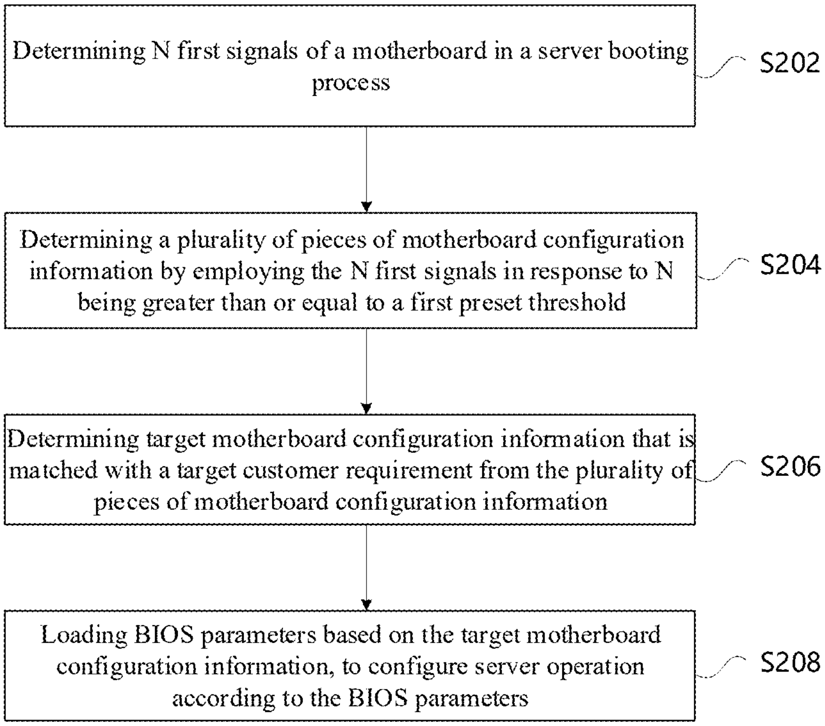
FIG. 2 is a flowchart of a server booting control method according to an embodiment of the present application.

In the present embodiment, a server booting control method is provided, which is applied to a basic input/output system (BIOS), wherein the BIOS is disposed in a motherboard of a server. FIG. 2 is a flowchart of a server booting control method according to an embodiment of the present application. As shown in FIG. 2, the server booting control method includes the following steps:

Step S202, determining N first signals of the motherboard in a server booting process, wherein the N first signals are configured for identifying the motherboard, and N is a natural number greater than 1;

Step S204, determining a plurality of pieces of motherboard configuration information by employing the N first signals in response to N being greater than or equal to a first preset threshold;

Step S206, determining target motherboard configuration information that is matched with a target customer requirement from the plurality of pieces of motherboard configuration information, wherein the target customer requirement is configured for representing a configuration requirement of a target customer for the motherboard; and Step S208, loading BIOS parameters based on the target motherboard configuration information, to configure server operation according to the BIOS parameters.

By means of the above steps, since the BIOS determines the N first signals of the motherboard in the server booting process, the plurality of pieces of motherboard configuration information are determined by employing the N first signals in response to the N first signals meet a certain number, the target motherboard configuration information that is matched with the target customer requirement is determined from the plurality of pieces of motherboard configuration information, and the BIOS parameters are loaded according to the target motherboard configuration information, to configure the server operation according to the BIOS parameters. Consequently, the adaptation of the server is performed in a firmware manner in combination with the exclusive identification information of the motherboard, and it is unnecessary to separately perform customized development for each server, and that the mirroring of one BIOS supports the booting and application of different types of servers with different processors may be satisfied, thereby the server availability is improved. Therefore, the problems of high configuration cost for customer requirements and poor server availability in the related art may be solved, and an effect for saving the server configuration cost, and improving the server availability may be achieved.

In an exemplary embodiment, the motherboard is configured to mount a server central processing unit (CPU) and other relevant components, including processors, memories, display cards, and storage devices. The motherboard includes a plurality of slots and interfaces configured to connect these hardware devices. The server CPU is the central processing unit for server applications. The server CPU is usually provided with more cores, larger caches, and higher frequencies to provide more powerful computing capability and higher data processing speed, thereby the server requirement for high-performance computing and multi-task processing is met. The server CPU includes, but is not limited to, a processor of an Intel platform, and a processor of an AMD platform.

In an exemplary embodiment, the BIOS parameters that are loaded based on the target motherboard configuration information are parameters corresponding to the target motherboard configuration information.

In an exemplary embodiment, a general purpose input/output (GPIO) signal is a digital signal, which is configured for controlling data transmission with a communication device. The GPIO signal is typically configured in a single chip or an embedded system, and configured to connect various external devices such as a sensor, an actuator, and a light-emitting diode (LED). The GPIO signal may be configured for inputting or outputting a digital signal to control a status of the device or receive data of the external sensor. A status value of the GPIO signal refers to a digital value configured for representing a switch status in a digital circuit. The status value of the GPIO signal may be 0 or 1, indicating a low level and a high level, respectively. The status value of the GPIO signal may further indicate other statuses, such as 2, and 3.

In an exemplary embodiment, the present embodiment is applicable to a scenario where server chips of any architecture is provided with built-in GPIO signals that may be combined for customer customized use. For example, since a CPU part of the processor on the Intel platform has the built-in GPIO signals, distinction may be achieved based on the GPIO signals when the BIOS is booted. For example, an exclusive identification number of 16 motherboards may be formed by at least 4 GPIO signals, that is, a plurality of pieces of motherboard configuration information correspond to the identification numbers from 0x00 to 0x0F. The status values of the 4 GPIO signals may confirm a server motherboard.

In an exemplary embodiment, the first signals may be the GPIO signals generated by the GPIO, or signals generated by another signal device for exclusively identifying the motherboard. The basic input/output system (BIOS) parameters are firmware settings loaded when a computer is booted, and are configured for configuring and controlling computer hardware. The BIOS parameters include, but not limited to the following information:

A booting sequence: referring to a sequence of devices to be read when the computer is booted, such as a hard disk drive, an optical disk drive, and a universal serial bus (USB) device.

Hardware settings: including relevant settings of hardware including the CPU, the memory, the hard disk, the display card, and the like, such as a clock frequency, a cache size, and a transmission mode.

Security setting: referring to relevant security settings for setting a BIOS password, enabling/disabling a USB port, and enabling/disabling a booting device.

Power management: including a sleep mode, an energy saving mode, fan control, and other settings related to power management.

Other settings: further including date and time settings, virtualization support, device information, and other related settings.

The BIOS parameters may be configured and modified by accessing a BIOS setting interface when the computer is booted. A function of loading the corresponding BIOS parameters and environmental variables is to configure and optimize an operating environment of a server system, to meet requirements and performance requirements. These settings may adjust the hardware and software of the server, to achieve better performance, security, and manageability.

For example, loading the corresponding BIOS parameters and environmental variable settings may achieve the following functions:

- Hardware configuration: by setting the BIOS parameters, an operating mode, performance parameters, and power management of the server hardware may be adjusted, to meet the requirements of an application scenario. For example, the CPU frequency, the memory speed, and the hard disk controller settings may be adjusted.
- System security: by setting the environmental variables, the security of the system may be enhanced, for example, a password strategy is set, and a security enabling option is enabled, to protect the system against unauthorized access or attack.
- Environmental monitoring: by setting the environmental variables, sensor monitoring parameters of the server system may be configured to monitor hardware indexes in real time such as a temperature, a voltage, and a fan speed, to discover and respond to the abnormality of a system health condition.
- Power management: by setting the BIOS parameters, the power management strategies may be configured to achieve energy conservation and environmental protection, and reduce energy consumption and heat emission.
- System optimization: according to an application requirement, by loading the corresponding BIOS parameters and environmental variable settings, the system may be optimized to improve the performance and stability of the system.

Loading the corresponding BIOS parameters and environmental variable settings has significant importance for the performance, security, and stability of the server system, and the server may be customized according to an actual requirement.

In an exemplary embodiment, the determining the plurality of pieces of motherboard configuration information by employing the N first signals in response to N being greater than the first preset threshold includes: reading a status value of each of the N first signals via a baseboard management controller (BMC); and randomly combining status values of the N first signals to obtain the plurality of pieces of motherboard configuration information, wherein each piece of the plurality of pieces of motherboard configuration information at least includes a combination of status values of M first signals, the combination of the status values of the M first signals is a hexadecimal numerical value, M is a natural number less than or equal to N, and M is greater than or equal to a second preset threshold.

In an exemplary embodiment, for example, when the CPU of the motherboard has the built-in GPIO signals and the quantity of the GPIO signals reaches 4 or more, and when the BIOS is booted, the status value of each GPIO signal is read, and the status values are combined according to a random rule into a plurality of hexadecimal numerical values, such as 0000, 0001, 0010, etc. In the present embodiment, by randomly forming the hexadecimal numerical value, the target motherboard configuration information that is matched with the target customer requirement may be selected rapidly.

In an exemplary embodiment, before the loading the BIOS parameters based on the target motherboard configuration information, to configure the server operation according to the BIOS parameters, the server booting control method further includes: storing the target motherboard configuration information into a variable in the BIOS. When the target customer requirement is acquired, the target motherboard configuration information is rapidly read from the variable.

In an exemplary embodiment, the loading the BIOS parameters based on the target motherboard configuration information, to configure the server operation according to the BIOS parameters includes: determining status values of the M first signals included in the target motherboard configuration information in response to the server being in an initialization phase, wherein a combination of the status values of the M first signals is a hexadecimal numerical value, M is a natural number less than or equal to N, and M is greater than or equal to a second preset threshold; loading the BIOS parameters based on the status values of the M first signals and the target customer requirement; and performing an initialization operation on devices in the server by employing the BIOS parameters. In an exemplary embodiment, the initialization phase of the server includes an initialization phase of the memory or an initialization phase of a peripheral component interconnect (PCI) link. The value of M is at least 4. The initialization operation includes at least one of the following: at least one of initializing variable information of a memory, initializing variable information of the PCI link, initializing variable information of the BMC, and initializing option variable information of the BIOS. In the present embodiment, the initialization operation is performed on the devices in the server by employing the BIOS parameters, and the settings may be performed according to a customer expected setting requirement, thereby the server availability is improved.

Figure 3:
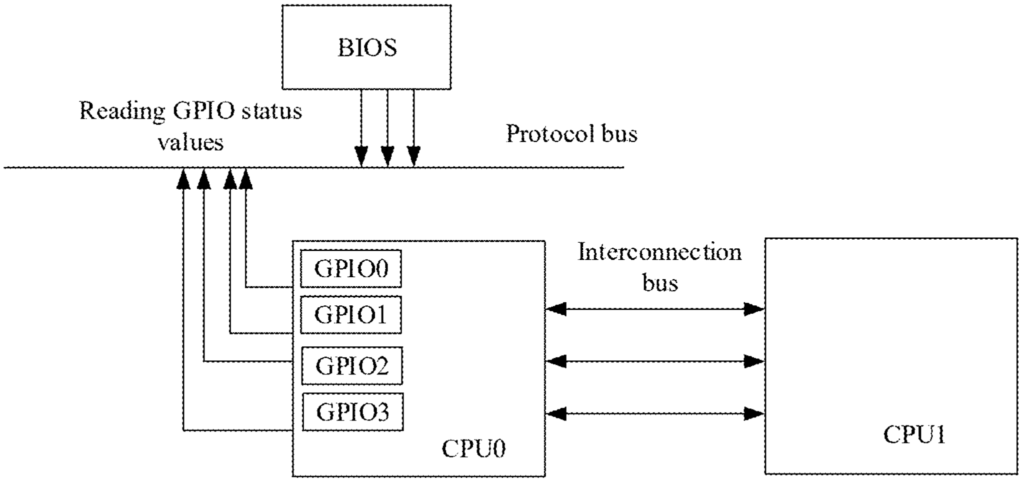
FIG. 3 is a structural diagram of hardware for determining and loading settings of corresponding basic input/output system (BIOS) parameters and environmental variables through a status value of a first signal according to an embodiment of the present application.

In an embodiment, when the first signal is a GPIO signal, a hardware structure for determining and loading the settings of the corresponding BIOS parameters and environmental variables through the status value of the GPIO signal is shown in FIG. 3, a server motherboard is provided with a master processor CPU0 and a slave processor CPU1, the CPU0 and the CPU1 are connected through an interconnection bus, and both the CPU0 and the CPU1 are provided with a GPIO0, a GPIO1, a GPIO2, and a GPIO3. Both the CPU0 and the CPU1 are connected to the BIOS, and the BIOS reads the status values of the GPIO0, GPIO1, GPIO2, and GPIO3 through a protocol bus.

Figure 4:
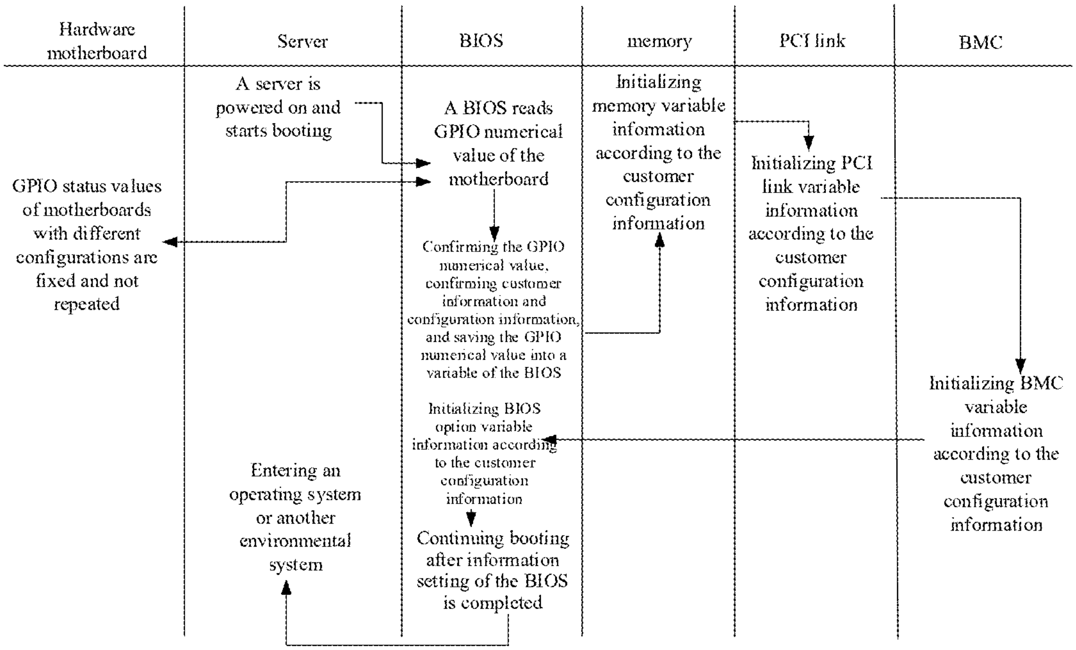
FIG. 4 is a schematic diagram of an interaction among devices disposed in a server motherboard according to an embodiment of the present application.

FIG. 4 is a schematic diagram of an interaction among devices configured in a server motherboard. FIG. 5 is a flowchart of an interaction among devices configured in a server motherboard, which includes the following steps:

- S501, starting a booting process of a server, and reading a status value of a GPIO signal in the motherboard by a BIOS, wherein the statuses of the GPIO signals of the motherboards with different configurations are fixed and not repeated;
- S502, confirming the status value of the GPIO signal by the BIOS, wherein as shown in FIG. 6A and FIG. 6B, the status values of 4 GPIO signals form a configuration, including a total of 8 pieces of configuration information;
- S503, when a BIOS option default value is set or in a phase of interaction with the BMC, performing comparison on an acquired hexadecimal numerical value first to confirm customer configuration information, for example, as shown in FIG. 6A and FIG. 6B, one piece of configuration information that is matched with the requirement of a customer A is selected from the 8 pieces of configuration information;
- S504, saving the status value of the GPIO signal that is matched with customer information and the configuration information required by the customer into a variable of the BIOS, for example, when the status value of the GPIO signal that is matched with the configuration information required by the customer is 0111, 0111 is stored into the variable of the BIOS;

S505, initializing memory variable information by a memory according to the configuration information of the customer;

S506, initializing PCI link variable information by a PCI link according to the configuration information of the customer;

S507, initializing BMC variable information by a BMC according to the configuration information of the customer;

S508, initializing BIOS option variable information by the BIOS according to the configuration information of the customer; and

S509, continuing booting after information setting of the BIOS is completed, and enabling the server to enter an operating system or another environmental system.

In an exemplary embodiment, in a booting process of the server, after the determining the N first signals of the motherboard in the server booting process, the server booting control method further includes: reading field replaceable unit (FRU) information from a BMC based on an intelligent platform management interface (IPMI) protocol in response to N being less than the first preset threshold, or abnormality occurring in reading the N first signals, wherein the FRU information includes information of the target customer and/or device information in the server; and loading the BIOS parameters based on the FRU information, to configure the server operation according to the BIOS parameters.

In an exemplary embodiment, the present embodiment is applicable to an advanced RISC machine (ARM) architecture server, in a scenario where the first GPIO signals of the CPU are insufficient or the status value of the GPIO first signal cannot be acquired when the BIOS is booted, the FRU information may be used to confirm which type of server motherboard and configuration the current server corresponds to. That is, when N is less than the first preset threshold, it indicates that there is no GPIO first signal in the motherboard, or the quantity of the GPIO first signals is less than 4. The abnormality occurring in reading the N GPIO first signals includes no GPIO first signal in the motherboard, or failure in reading the status values of sufficient GPIO first signals when the quantity of the GPIO first signals is less than 4.

In an exemplary embodiment, the FRU information includes but is not limited to: a hard disk drive: a model, a capacity, and an interface type; a memory bank: a model, a capacity, and a speed; a battery: a model and a capacity; a power supply: a model and a power; a display screen: a model and a resolution ratio; a CPU: a model and a frequency; a fan: a model and a size; a motherboard: a model and an interface type; a network card: a model and an interface type; and a printer cartridge: a model and a color. The information may help the user to rapidly find a suitable alternative product when a component needs to be replaced.

In an exemplary embodiment, the loading the BIOS parameters based on the FRU information, to configure the server operation according to the BIOS parameters includes: determining first motherboard configuration information corresponding to the information of the target customer in response to the FRU information including the information of the target customer; and loading the BIOS parameters based on the first motherboard configuration information, to configure the server operation according to the BIOS parameters.

In an exemplary embodiment, the loading the BIOS parameters based on the FRU information, to configure the server operation according to the BIOS parameters includes: determining second motherboard configuration information corresponding to the information of the target customer in response to the FRU information including the information of the target customer and the device information in the server; and loading the BIOS parameters based on the second motherboard configuration information, to configure the server operation according to the BIOS parameters.

In an exemplary embodiment, the loading the BIOS parameters based on the FRU information, to configure the server operation according to the BIOS parameters includes: determining third motherboard configuration information corresponding to the information of the target customer in response to the FRU information including the device information in the server, or the FRU information being null, wherein the third motherboard configuration information is a set default parameter in response to the BIOS being booted; and loading the BIOS parameters based on the third motherboard configuration information, to configure the server operation according to the BIOS parameters.

In the present embodiment, by loading the BIOS parameters through the FRU information, when the status value of the first signal cannot be read, the configuration information required by the customer may be determined rapidly, thereby the server availability is improved.

Figure 7:
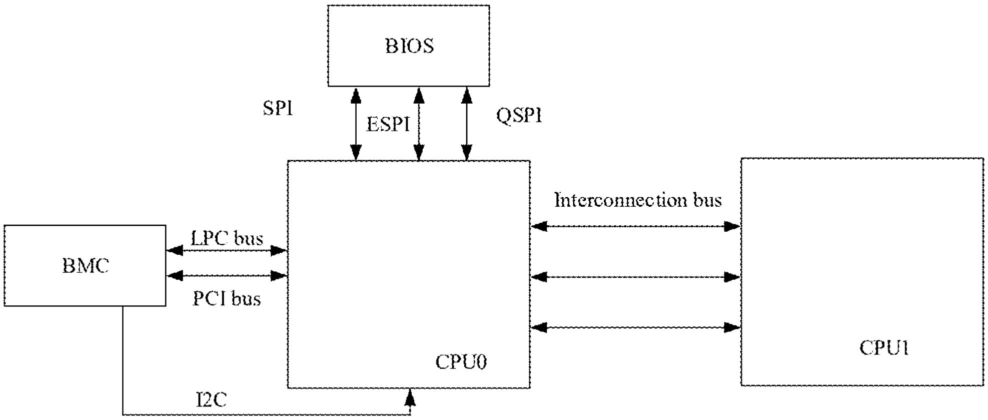
FIG. 7 is a structural diagram of hardware for determining and loading settings of corresponding BIOS parameters and environmental variables through field replaceable unit (FRU) information according to an embodiment of the present application.

In an embodiment, a hard structure for determining and loading settings of the corresponding BIOS parameters and environmental variables through the FRU information is shown in FIG. 7, a server motherboard is provided with a master processor CPU0 and a slave processor CPU1, the CPU0 and the CPU1 are connected through an interconnection bus, and both the CPU0 and the CPU1 are connected to a BMC and a BIOS.

Figure 8:
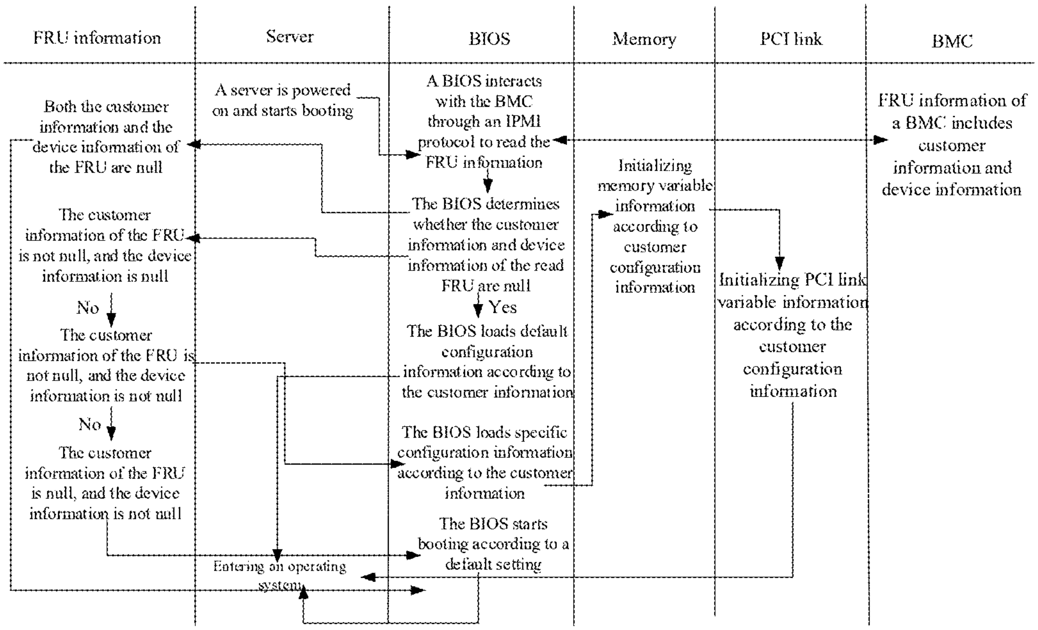
FIG. 8 is a schematic diagram of an interaction among devices disposed in a server motherboard according to an embodiment of the present application.
Figures 9, 10:
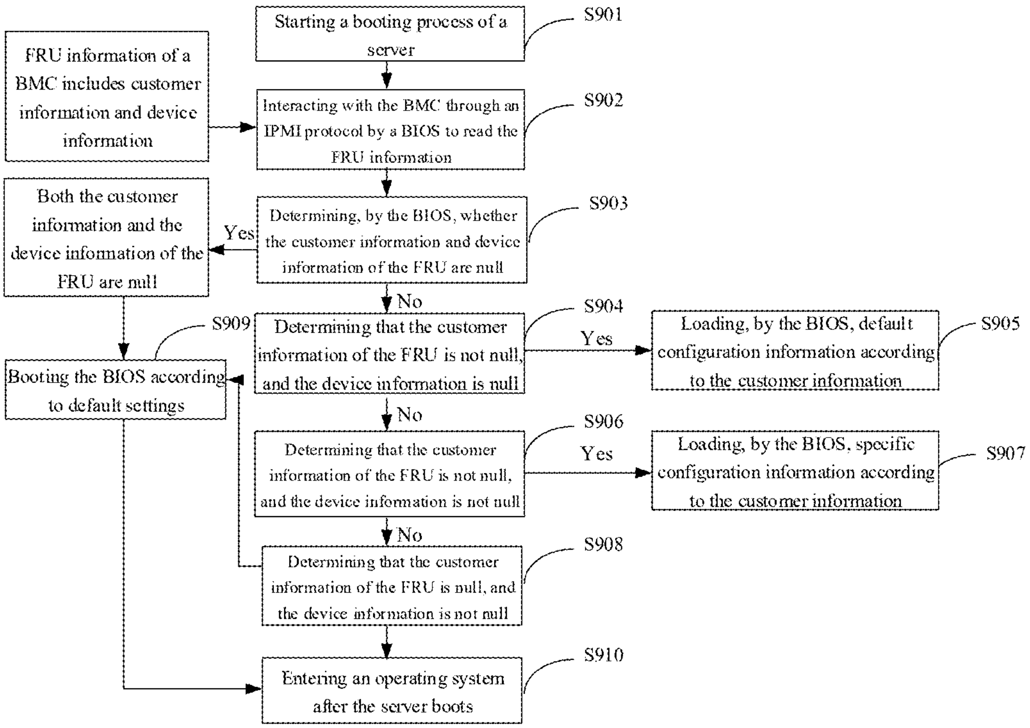
FIG. 9 is a flowchart of an interaction among devices disposed in a server motherboard according to an embodiment of the present application.
FIG. 10 is a schematic diagram of FRU information according to an embodiment of the present application.

FIG. 8 is a schematic diagram of an interaction among devices disposed in a server motherboard. FIG. 9 is a flowchart of an interaction among devices disposed in a server motherboard, which includes the following steps:

S901, starting a booting process of a server;

S902, interacting with the BMC through an IPMI protocol by the BIOS to read FRU information, wherein the FRU information is shown in FIG. 10;

S903, determining, by the BIOS, whether customer information and device information of the read FRU information are null;

S904, determining, by the BIOS, that the customer information is not null and determining, by the BIOS, whether the device information is null;

S905, loading default configuration information (i.e., default parameters when the BIOS is booted) according to the customer information by the BIOS in response to the BIOS determining that the customer information is not null, and the device information is null;

S906, performing S907 in response to the BIOS determining that the customer information is not null, and the device information is not null;

S907, loading, by the BIOS, specific configuration information (i.e., second motherboard configuration information) according to the customer information, and performing S910;

S908, performing S909 in response to the BIOS determining that the customer information is null, and the device information is not null;

S909, booting the BIOS according to a default setting; and

S910, enabling the server to enter an operating system.

In an exemplary embodiment, after the determining the N first signals of the motherboard in the server booting process, the server booting control method further includes: setting an expansion chip through a bus disposed in the motherboard in response to N being less than the first preset threshold, or abnormality occurring in reading the N first signals; generating the N first signals via the expansion chip; and reading a status value of each of the N first signals from a BMC through an IPMI protocol, wherein the BMC is configured to assign the status value of each of the N first signals to a corresponding variable in the BMC.

In an exemplary embodiment, the present embodiment is applicable to a scenario where the quantity of first signals of the CPU is insufficient or there is no first signal in the CPU, and implements a mirroring function of the BIOS that the BIOS acquires the server motherboard information confirmed by the BMC through an IPMI command to load different hardware motherboards of a same type of a processor.

In an exemplary embodiment, after the acquiring the status value of each of the N first signals by the BMC, and assigning the status value of each of the N first signals to the corresponding variable in the BMC, the server booting control method further includes: reading the status value of each of the N first signals from the BMC through a bus protocol; and randomly combining status values of the N first signals to obtain the plurality of pieces of motherboard configuration information, wherein each piece of the plurality of pieces of motherboard configuration information at least includes a combination of status values of M first signals, the combination of the status values of the M first signals is a hexadecimal numerical value, M is a natural number less than or equal to N, and M is greater than or equal to a second preset threshold. In the present embodiment, by reading the status value of each first signal, the motherboard configuration information that is matched with the target customer requirement may be selected rapidly.

In an exemplary embodiment, after the generating the N first signals via the expansion chip, the server booting control method further includes: setting the status value of each of the N first signals as a preset status value in response to abnormality occurring in acquiring the status value of each of the first signals from the BMC; and determining the target motherboard configuration information according to the preset status value. The preset status value may be a numerical value in a form of 0xFF. The BIOS interacts with the BMC through an inter-integrated circuit (I2C) protocol to acquire a first status value, performs corresponding booting according to the acquired status value, loads the default customer configuration information when failure occurs in acquiring the first status value from the BMC, loads the specific configuration information of the specific customer according to the acquired status value when the first status value of the BMC is normally acquired, and performs initialization setting on the memory according to the requirement of the customer. For example, the memory may correct an error threshold, the BIOS starts an option setting, such as a booting sequence, and the information transmitted by the BMC such as vendor information is customized for transmission. In the present embodiment, the target configuration information may be determined accurately according to the status value of the first signal.

Figure 11:
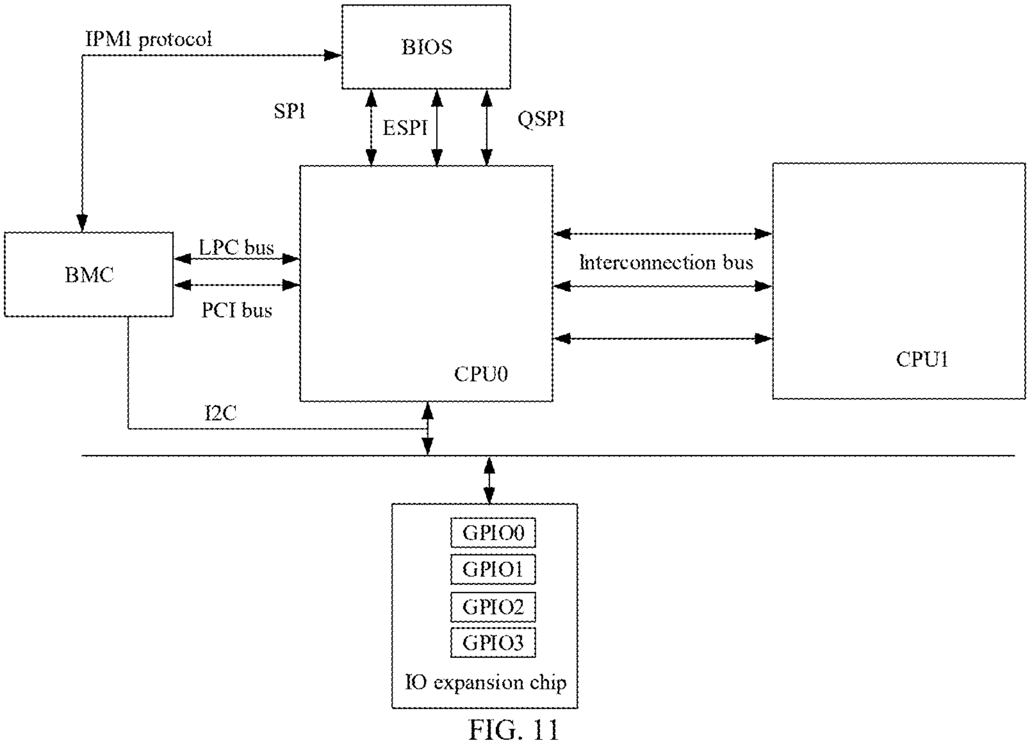
FIG. 11 is a structural diagram of hardware for loading corresponding BIOS parameters and environmental variables by setting an expansion chip according to an embodiment of the present application.

In an embodiment, a hardware structure for loading settings of the corresponding BIOS parameters and environmental variables by setting an expansion chip is shown in FIG. 11, a server motherboard is provided with a master processor CPU0 and a slave processor CPU1, the CPU0 and the CPU1 are connected through an interconnection bus, both the CPU0 and the CPU1 are respectively connected to a BMC and a BIOS, and the CPU0 and the CPU1 are connected to an IO expansion chip through an I2C bus.

Figure 12:
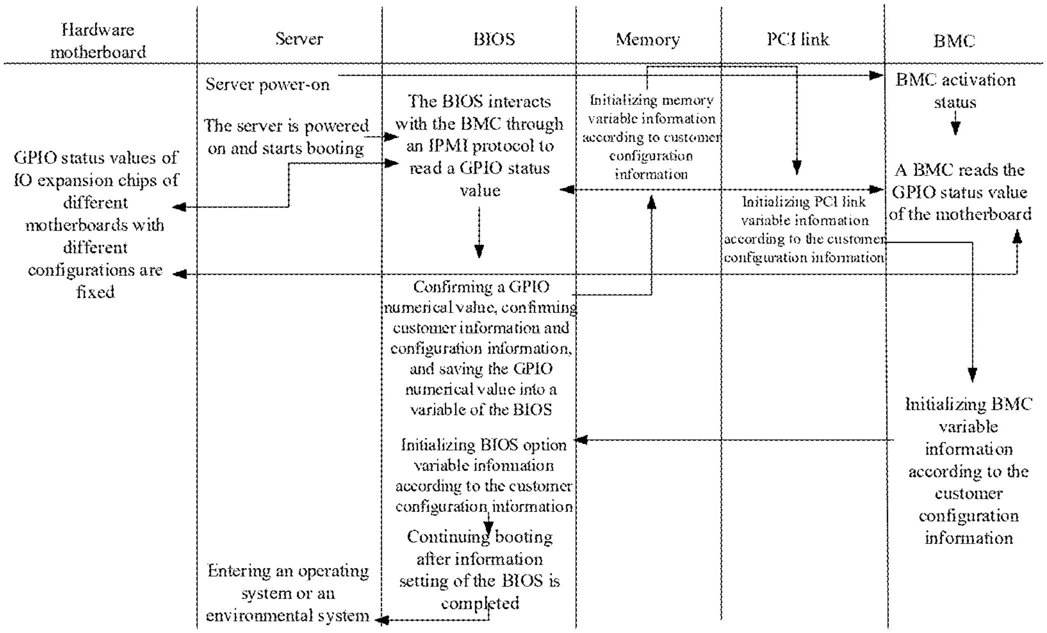
FIG. 12 is a schematic diagram of an interaction among devices disposed in a server motherboard according to an embodiment of the present application.
Figure 13:
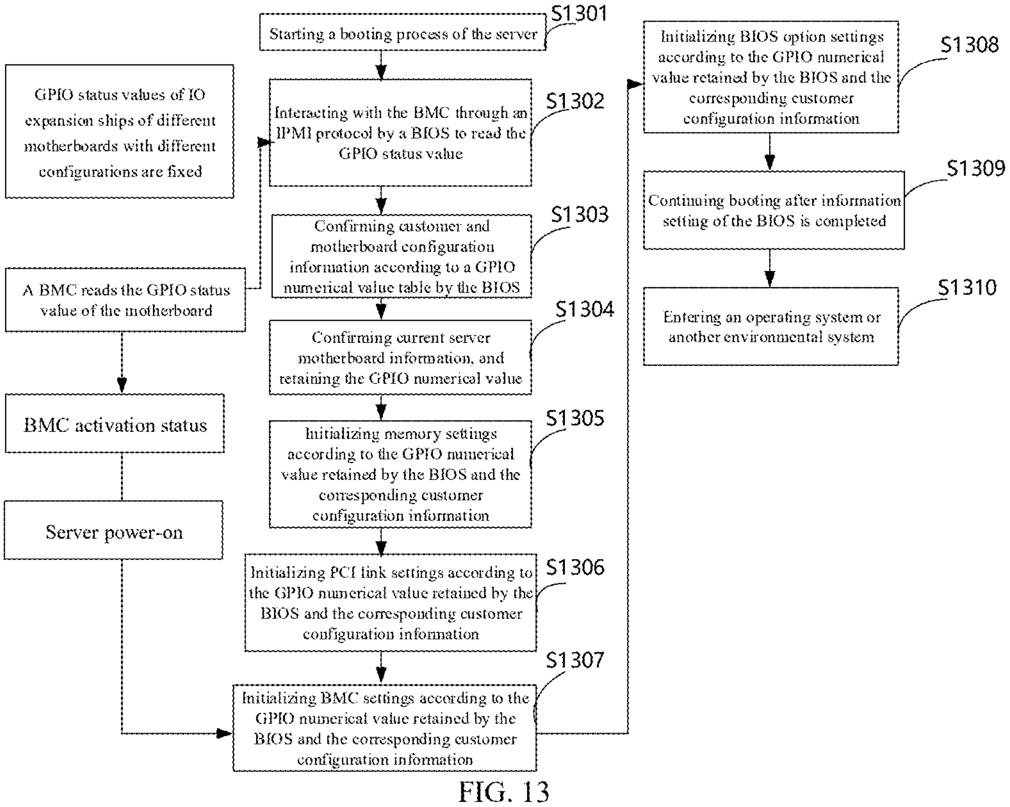
FIG. 13 is a flowchart of an interaction among devices disposed in a server motherboard according to an embodiment of the present application.

FIG. 12 is a schematic diagram of an interaction among devices disposed in a server motherboard. FIG. 13 is a flowchart of an interaction among devices disposed in a server motherboard, which includes the following steps:

S1301, starting a booting process of a server, and reading a status value of a GPIO signal in the motherboard by the BIOS, wherein the statuses of the GPIO signals of the IO expansion chips of the motherboards with different configurations are fixed and not repeated;

S1302, confirming the status value of the GPIO signal by the BIOS, wherein as shown in FIG. 6A and FIG. 6B, the status values of 4 GPIO signals form a configuration, including a total of 8 pieces of configuration information;

S1303, when a BIOS option default value is set or in a phase of interaction with the BMC, performing comparison on an acquired hexadecimal numerical value first to confirm specific customer configuration information, for example, as shown in FIG. 6A and FIG. 6B, one piece of configuration information that is matched with the requirement of a customer A is selected from the 8 pieces of configuration information;

S1304, saving the status value of the GPIO signal that is matched with customer information and the configuration information required by the customer into a variable of the BIOS;

S1305, initializing memory variable information by a memory according to the configuration information of the customer;

S1306, initializing PCI link variable information by a PCI link according to the configuration information of the customer;

S1307, initializing BMC variable information by the BMC according to the configuration information of the customer;

S1308, initializing BIOS option variable information by the BIOS according to the configuration information of the customer;

S1309, continuing booting after information setting of the BIOS is completed; and

S1310, enabling the server to enter an operating system or another environmental system.

Through the above description of the implementations, a person skilled in the art may clearly know that the method according to the above embodiments may be implemented by means of software with necessary universal hardware platforms, and of course, may also be implemented by means of hardware. However, the former is the optimal implementation in many circumstances. Based on this understanding, the technical solutions of the present application or the part contributing to the prior art may be essentially embodied in a form of software products. The computer software product is stored in a storage medium (such as read-only memory/random access memory (ROM/RAM), magnetic disks, optical disks, etc.) including a plurality of instructions for making a terminal device (which may be a mobile phone, a computer, a server, or a network device, etc.) execute the method described in each embodiment of the present application.

A server booting control apparatus is further provided by the present embodiment. The apparatus is configured to implement the foregoing embodiments. Those that are already stated are not repeated herein. As used below, a term "module" may be a combination of software and/or hardware that implements a predetermined function. Although the apparatus described in the following embodiments is implemented by software, the apparatus may also be implemented by the hardware, or a combination of software and hardware.

Figure 14:
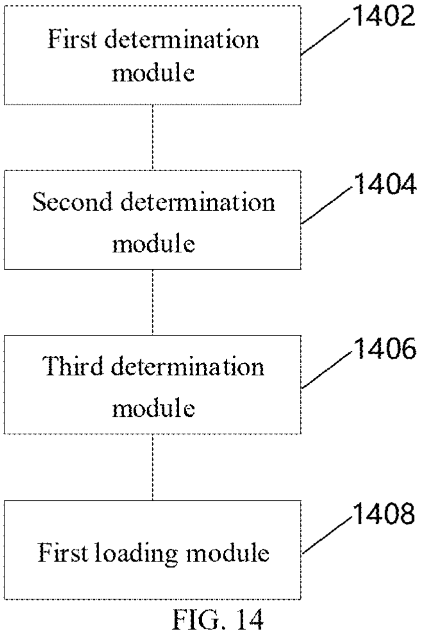
FIG. 14 is structural block diagram of a server booting control apparatus according to an embodiment of the present application.

FIG. 14 is structural block diagram of a server booting control apparatus according to an embodiment of the present application, which is applied to a BIOS, and the BIOS is disposed in a motherboard of a server. As shown in FIG. 14, the apparatus includes:

a first determination module 1402, configured to determine N first signals of the motherboard in a server booting process, wherein the N first signals are configured for identifying the motherboard, and N is a natural number greater than 1;

a second determination module 1404, configured to determine a plurality of pieces of motherboard configuration information by employing the N first signals in response to N being greater than or equal to a first preset threshold;

a third determination module 1406, configured to determine target motherboard configuration information that is matched with a target customer requirement from the plurality of pieces of motherboard configuration information, wherein the target customer requirement is configured for representing a configuration requirement of a target customer for the motherboard; and a first loading module 1408, configured to load BIOS parameters based on the target motherboard configuration information, to configure server operation according to the BIOS parameters.

In an exemplary embodiment, the second determination module includes: a first reading unit, configured to read a status value of each of the N first signals via a BMC; and a first combination unit, configured to randomly combine status values of the N first signals to obtain the plurality of pieces of motherboard configuration information, wherein each piece of the plurality of pieces of motherboard configuration information at least includes a combination of status values of M first signals, the combination of the status values of the M first signals is a hexadecimal numerical value, M is a natural number less than or equal to N, and M is greater than or equal to a second preset threshold.

In an exemplary embodiment, the apparatus further includes: a first storage module, configured to store the target motherboard configuration information into a variable in the BIOS before the BIOS parameters are loaded based on the target motherboard configuration information to configure server operation according to the BIOS parameters.

In an exemplary embodiment, the first loading module includes: a first determination unit, configured to determine status values of the M first signals included in the target motherboard configuration information in response to the server being in an initialization phase, wherein a combination of the status values of the M first signals is the hexadecimal numerical value, M is a natural number less than or equal to N, and M is greater than or equal to the second preset threshold; a first loading unit, configured to load the BIOS parameters based on the status values of the M first signals and the target customer requirement; and a first operation unit, configured to perform an initialization operation on devices in the server by employing the BIOS parameters.

In an exemplary embodiment, the initialization operation includes at least one of initializing variable information of a memory, initializing variable information of a PCI link, initializing variable information of a BMC, and initializing option variable information of the BIOS.

In an exemplary embodiment, the apparatus further includes: a second reading unit, configured to, after the determining the N first signals of the motherboard in the server booting process, read FRU information from the BMC based on an IPMI protocol in response to N being less than the first preset threshold, or abnormality occurring in reading the N first signals, wherein the FRU information includes information of the target customer and/or device information in the server; and a first configuration unit, configured to load the BIOS parameters based on the FRU information, to configure the server operation according to the BIOS parameters.

In an exemplary embodiment, the first configuration unit includes: a first determination sub-unit, configured to determine first motherboard configuration information corresponding to the information of the target customer in response to the FRU information including the information of the target customer; and a first loading sub-unit, configured to load the BIOS parameters based on the first motherboard configuration information, to configure the server operation according to the BIOS parameters.

In an exemplary embodiment, the first configuration unit includes: a second determination sub-unit, configured to determine second motherboard configuration information corresponding to the information of the target customer in response to the FRU information including the information of the target customer and the device information in the server; and a second loading sub-unit, configured to load the BIOS parameters based on the second motherboard configuration information, to configure the server operation according to the BIOS parameters.

In an exemplary embodiment, the first configuration unit includes: a third determination sub-unit, configured to determine third motherboard configuration information corresponding to the information of the target customer in response to the FRU information including the device information in the server, or the FRU information is null, wherein the third motherboard configuration information is a set default parameter in response to the BIOS being booted; and a third loading sub-unit, configured to load the BIOS parameters based on the third motherboard configuration information, to configure the server operation according to the BIOS parameters.

In an exemplary embodiment, the apparatus further includes: a first setting module, configured to, after the determining the N first signals of the motherboard in the server booting process, set an expansion chip through a bus disposed in the motherboard in response to N being less than the first preset threshold, or abnormality occurring in reading the N first signals; a first generation module, configured to generate the N first signals via the expansion chip; and a first reading module, configured to read the status value of each of the N first signals from a BMC through an IPMI protocol, wherein the BMC is configured to assign the status value of each of the N first signals to a corresponding variable in the BMC.

In an exemplary embodiment, the apparatus further includes: a second reading module, configured to, after the acquiring the status value of each of the N first signals by the BMC, and assigning the status value of each of the N first signals to the corresponding variable in the BMC, read the status value of each of the N first signals from the BMC through a bus protocol; and a first combination module, configured to randomly combine status values of the N first signals to obtain the plurality of pieces of motherboard configuration information, wherein each piece of the plurality of pieces of motherboard configuration information at least includes a combination of status values of M first signals, the combination of the status values of the M first signals is a hexadecimal numerical value, M is a natural number less than or equal to N, and M is greater than or equal to a second preset threshold.

In an exemplary embodiment, the apparatus further includes: a second setting module, configured to set the status value of each of the first signals as a preset status value in response to abnormality occurring in acquiring the status value of each of the first signals by the BMC after the N first signals are generated by the expansion chip; and a fourth determination module, configured to determine the target motherboard configuration information according to the preset status value.

In an exemplary embodiment, the apparatus further includes: a first triggering module, configured to trigger the server to enter an operating system or another environmental system after the BIOS parameters are loaded based on the target motherboard configuration information to configure the server operation according to the BIOS parameters.

A server is further provided by another embodiment of the present application, which includes a BIOS and a motherboard, wherein the BIOS is configured to implement the steps of the server booting control method stated above; the motherboard includes a plurality of processors, each of the plurality of processors includes N signal devices, the N signal devices are configured to generate the N first signals, the plurality of processors are connected through an interconnection bus, and the plurality of processors are connected to the BIOS through a protocol bus.

In an exemplary embodiment, the server further includes a BMC, wherein the BMC is configured to read a status value of each of the N first signals in response to N being greater than or equal to a first preset threshold and transmit the status value of each of the N first signals to the BIOS; or the BMC is configured to transmit FRU information to the BIOS through an IPMI protocol in response to N being less than the first preset threshold or abnormality occurring in reading the N first signals by the BIOS.

In an exemplary embodiment, the server further includes an expansion chip, wherein the expansion chip is configured to generate the N first signals, wherein the expansion chip is a chip set through a bus disposed in the motherboard in response to N being less than the first preset threshold, or abnormality occurring in reading the N first signals, and the expansion chip is connected to the plurality of processors through an I2C bus.

In an exemplary embodiment, a status value of each of the N first signals is acquired by a BMC, the status value of each of the N first signals is assigned by the BMC to a corresponding variable in the BMC, and the BIOS reads the status value of each of the N first signals from the BMC through an IPMI protocol.

It should be noted that the above modules may be implemented by software or hardware, and the latter may be realized in the following ways, but not limited to this: the above modules are all disposed in the same processor; or the above modules are disposed in different processors in any combination.

A computer non-transitory readable storage medium is further provided by the present application, wherein the computer non-transitory readable storage medium stores a computer program, in response to being executed by a processor, the computer program executes the server booting control method.

Figure 15:
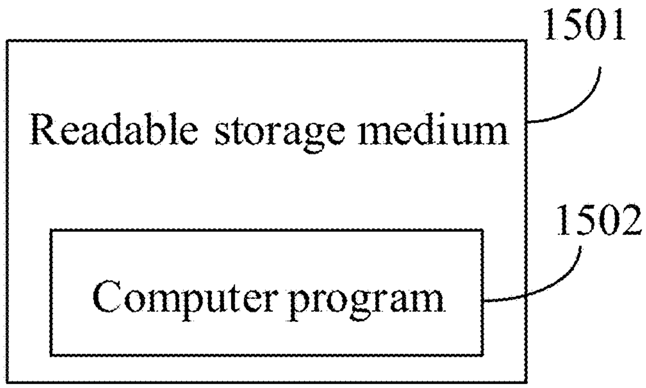
FIG. 15 is a schematic diagram of an embodiment of a computer non-transitory readable storage medium of a server booting control method according to the present application.

FIG. 15 is a schematic diagram of an embodiment of a computer non-transitory readable storage medium of a server booting control method according to the present application. Taking the computer non-transitory readable storage medium shown in FIG. 15 as an example, the computer non-transitory readable storage medium 1501 stores a computer program 1502, in response to being executed by a processor, the computer program executes the aforementioned method.

Figure 16:
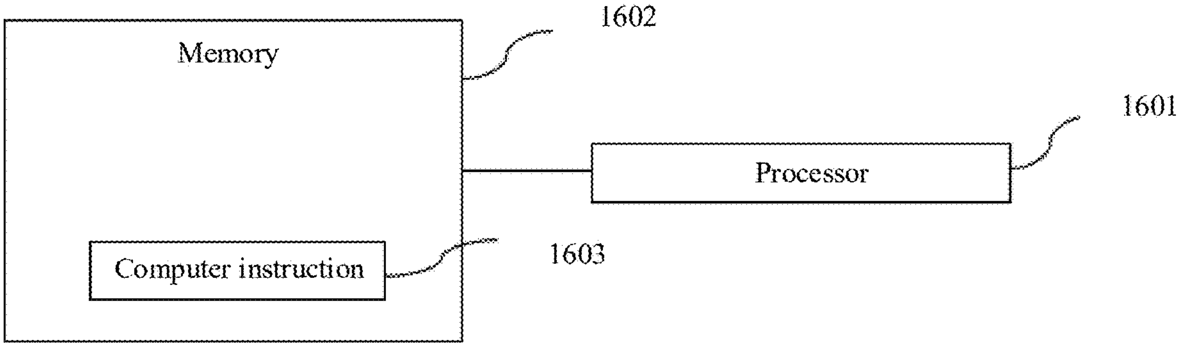
FIG. 16 is a schematic structural diagram of hardware of an embodiment of an electronic device of a server booting control method according to the present application.

FIG. 16 is a schematic structural diagram of hardware of an embodiment of an electronic device of a server booting control method according to the present application.

Taking the apparatus shown in FIG. 16 as an example, the apparatus includes a processor 1601 and a memory 1602.

The processor 1601 and the memory 1602 may be connected through a bus or in other ways. In FIG. 16, connection through the bus is taken as an example.

The memory 1602, as a non-transitory computer-readable storage medium, may be configured to store a non-transitory software program, a non-transitory computer executable program, and a module, such as program instructions/modules corresponding to the server booting control method in the embodiments of the present application. The processor 1601 executes functional applications and data processing, i.e. implementing the server booting control method by running the non-transitory software program, instructions, and modules stored in the memory 1602.

The memory 1602 may include a program storage area and a data storage area, wherein the program storage area may store an operating system and an application program required by at least one function; and the data storage area may store data created according to the use of the server booting control method. Furthermore, the memory 1602 may include a high-speed random access memory, and may further include a non-transitory memory, such as at least one magnetic storage device, flash memories or other non-transitory solid-state memories. In some embodiments, the memory 1602 in an exemplary embodiment includes a memory that is disposed remotely relative to the processor 1601, and these remote memories may be connected to a local module through a network. Examples of the network include, but are not limited to the Internet, Intranets, local area networks (LANs), mobile communication networks, and combinations thereof.

One or more computer instructions 1603 corresponding to the server booting control method are stored in the memory 1602, and in response to being executed by the processor 1601, the one or more computer instructions execute the server booting control method in any of the above method embodiments.

Any embodiment of the computer device executing the server booting control method may achieve a same or similar effect as any of the corresponding aforementioned method embodiments.

A computer program product is further provided by an embodiment of the present application. The computer program product includes a computer program, wherein the computer program, in response to being executed by a processor, implements the steps in any of the aforementioned method embodiments.

Another computer program product is further provided by an embodiment of the present application, which includes a non-transitory computer-readable storage medium, wherein the non-transitory computer-readable storage medium stores a computer program, and the computer program, in response to being executed by a processor, implements the steps in any of the aforementioned method embodiments.

A computer program is further provided by an embodiment of the present application, wherein the computer program includes computer instructions, and the computer instructions are stored in a computer-readable storage medium; and a processor of a computer device reads the computer instructions from the computer-readable storage medium, and the processor executes the computer instructions to make the computer device to execute the steps in any of the aforementioned method embodiments.

Finally, it shall be noted that those ordinary skilled in the art may understand that implementing all or part of the process in method of the above-mentioned embodiments may be completed by instructing related hardware through the computer program, the program of the server booting control method may be stored in a computer non-transitory readable storage medium, and when executed, the program may include the process of the embodiments of the above-mentioned method. The non-transitory readable storage medium of the program may be a magnetic disk, an optical disk, a read-only memory (ROM), or a random access memory (RAM). The embodiment of the computer program described above may achieve the same or similar effects as any of the corresponding method embodiments described above.

The above are exemplary embodiments disclosed in the present application, but it should be noted that various changes and modifications may be made without departing from the scope disclosed in the embodiments of the present application as defined by the claims. The functions, steps and/or actions of the server booting control method claims according to the disclosed embodiments described herein need not be performed in any particular order. Furthermore, although elements disclosed in the embodiments of the present application may be described or claimed in an individual form, the elements may also be understood as plural unless explicitly limited to the singular.

It should be understood that as used herein, the singular form "a" and "an" are intended to include the plural form, unless the context clearly supports exceptions. It should be also understood that "and/or" used herein refers to any and all possible combinations including one or more associated listed items.

The sequence numbers of the foregoing embodiments of the present application are merely for description purpose but do not imply the preference among the embodiments.

A person skilled in the art may understand that all or some of the steps of the foregoing embodiments may be implemented by using hardware, or may be implemented by a program instructing relevant hardware. The program may be stored in a computer non-transitory readable storage medium. The non-transitory readable storage medium may be a read-only memory, a magnetic disk, an optical disk, or the like.

It should be understood by a person skilled in the art that the discussion of any of the above embodiments is only exemplary, and is not intended to imply that the scope (including the claims) disclosed by the embodiments of the present application is limited to these examples; and under the concept of the embodiments of the present application, technical features in the above embodiments or different embodiments may also be combined, and there are many other variations in different aspects of the embodiments of the present application, which are not provided in details for the sake of conciseness. Therefore, any omission, modification, equivalent substitution, and improvement made within the spirit and principle of the embodiments of the present application shall be included within the protection scope of the present application.

The invention claimed is:

1. A server booting control method, applied to a basic input/output system (BIOS), the BIOS being disposed in a motherboard of a server, and the server booting control method comprising:

determining N first signals of the motherboard in a server booting process, wherein the N first signals are configured for identifying the motherboard, and N is a natural number greater than 1;

determining a plurality of pieces of motherboard configuration information by employing the N first signals in response to N being greater than or equal to a first preset threshold;

determining target motherboard configuration information that is matched with a target customer requirement from the plurality of pieces of motherboard configuration information, wherein the target customer requirement is configured for representing a configuration requirement of a target customer for the motherboard; and loading BIOS parameters based on the target motherboard configuration information, to configure server operation according to the BIOS parameters;

wherein after the determining the N first signals of the motherboard in the server booting process, the server booting control method further comprises: reading field replaceable unit (FRU) information from a BMC based on an intelligent platform management interface (IPMI) protocol in response to N being less than the first preset threshold, or abnormality occurring in reading the N first signals, wherein the FRU information comprises information of the target customer and/or device information in the server; and loading the BIOS parameters based on the FRU information, to configure the server operation according to the BIOS parameters.

2. The server booting control method according to claim 1, wherein the determining the plurality of pieces of motherboard configuration information by employing the N first signals in response to N being greater than the first preset threshold comprises:

reading a status value of each of the N first signals via a baseboard management controller (BMC); and randomly combining status values of the N first signals to obtain the plurality of pieces of motherboard configuration information, wherein each piece of the plurality of pieces of motherboard configuration information at least comprises a combination of status values of M first signals, the combination of the status values of the M first signals is a hexadecimal numerical value, M is a natural number less than or equal to N, and M is greater than or equal to a second preset threshold.

3. The server booting control method according to claim 1, wherein before the loading the BIOS parameters based on the target motherboard configuration information, to configure the server operation according to the BIOS parameters, the server booting control method further comprises:

storing the target motherboard configuration information into a variable in the BIOS.

4. The server booting control method according to claim 1, wherein the loading the BIOS parameters based on the target motherboard configuration information, to configure the server operation according to the BIOS parameters comprises:

determining status values of M first signals comprised in the target motherboard configuration information in response to the server being in an initialization phase, wherein a combination of the status values of the M first signals is a hexadecimal numerical value, M is a natural number less than or equal to N, and M is greater than or equal to a second preset threshold;

loading the BIOS parameters based on the status values of the M first signals and the target customer requirement; and performing an initialization operation on devices in the server by employing the BIOS parameters.

5. The server booting control method according to claim 4, wherein the initialization operation comprises at least one of initializing variable information of a memory, initializing variable information of a peripheral component interconnect (PCI) link, initializing variable information of a BMC, and initializing option variable information of the BIOS.

6. The server booting control method according to claim 1, wherein the loading the BIOS parameters based on the FRU information, to configure the server operation according to the BIOS parameters comprises:

determining first motherboard configuration information corresponding to the information of the target customer in response to the FRU information comprising the information of the target customer; and loading the BIOS parameters based on the first motherboard configuration information, to configure the server operation according to the BIOS parameters.

7. The server booting control method according to claim 1, wherein the loading the BIOS parameters based on the FRU information, to configure the server operation according to the BIOS parameters comprises:

determining second motherboard configuration information corresponding to the information of the target customer in response to the FRU information comprising the information of the target customer and the device information in the server; and loading the BIOS parameters based on the second motherboard configuration information, to configure the server operation according to the BIOS parameters.

8. The server booting control method according to claim 1, wherein the loading the BIOS parameters based on the FRU information, to configure the server operation according to the BIOS parameters comprises:

determining third motherboard configuration information corresponding to the information of the target customer in response to the FRU information comprising the device information in the server, or the FRU information being null, wherein the third motherboard configuration information is a set default parameter in response to the BIOS being booted; and loading the BIOS parameters based on the third motherboard configuration information, to configure the server operation according to the BIOS parameters.

9. The server booting control method according to claim 1, wherein after the determining the N first signals of the motherboard in the server booting process, the server booting control method further comprises:

setting an expansion chip through a bus disposed in the motherboard in response to N being less than the first preset threshold, or abnormality occurring in reading the N first signals;

generating the N first signals via the expansion chip; and reading a status value of each of the N first signals from a BMC through an IPMI protocol, wherein the BMC is configured to assign the status value of each of the N first signals to a corresponding variable in the BMC.

10. The server booting control method according to claim 9, wherein after the acquiring the status value of each of the N first signals by the BMC, and assigning the status value of each of the N first signals to the corresponding variable in the BMC, the server booting control method further comprises:

reading the status value of each of the N first signals from the BMC through a bus protocol; and randomly combining status values of the N first signals to obtain the plurality of pieces of motherboard configuration information, wherein each piece of the plurality of pieces of motherboard configuration information at least comprises a combination of status values of M first signals, the combination of the status values of the M first signals is a hexadecimal numerical value, M is a natural number less than or equal to N, and M is greater than or equal to a second preset threshold.

11. The server booting control method according to claim 9, wherein after the generating the N first signals via the expansion chip, the server booting control method further comprises:

setting the status value of each of the N first signals as a preset status value in response to abnormality occurring in acquiring the status value of each of the N first signals from the BMC; and determining the target motherboard configuration information according to the preset status value.

12. The server booting control method according to claim 1, wherein after the loading the BIOS parameters based on the target motherboard configuration information, to configure the server operation according to the BIOS parameters, the server booting control method further comprises:

triggering the server to enter an operating system or another environmental system.

13. A server, comprising a BIOS and a motherboard, wherein the BIOS is configured to implement the steps of the server booting control method according to claim 1; the motherboard comprises a plurality of processors, each of the plurality of processors comprises N signal devices, the N signal devices are configured to generate the N first signals, and the plurality of processors are connected through an interconnection bus, and the plurality of processors are connected to the BIOS through a protocol bus.

14. The server according to claim 13, wherein the server further comprises a BMC, wherein the BMC is configured to read a status value of each of the N first signals in response to N being greater than or equal to the first preset threshold, and transmit the status value of each of the N first signals to the BIOS; or the BMC is configured to transmit FRU information to the BIOS through an IPMI protocol in response to N being less than the first preset threshold, or abnormality occurring in reading the N first signals by the BIOS.

15. The server according to claim 13, wherein the server further comprises an expansion chip, the expansion chip is configured to generate the N first signals, wherein the expansion chip is a chip set through a bus disposed in the motherboard in response to N being less than the first preset threshold, or abnormality occurring in reading the N first signals, and the expansion chip is connected to the plurality of processors through an inter-integrated circuit (I2C) bus.

16. The server according to claim 15, wherein a status value of each of the N first signals is acquired by a BMC, the status value of each of the N first signals is assigned by the BMC to a corresponding variable in the BMC, and the BIOS reads the status value of each of the N first signals from the BMC through an IPMI protocol.

17. A non-transitory computer readable storage medium, wherein the non-transitory computer readable storage medium stores a computer program therein, wherein the computer program, in response to being executed by a processor, implements the steps of the server booting control method according to claim 1.

18. An electronic device, comprising a memory, a processor, and a computer program stored in the memory and capable of running on the processor, wherein the processor, in response to executing the computer program, implements the steps of the server booting control method according to claim 1.

19. The server booting control method according to claim 1, wherein each of the N first signals is a general purpose input/output (GPIO) signal generated by a GPIO.

20. The server booting control method according to claim 19, wherein status values of 4 GPIO signals are used to confirm a motherboard.

* * * * *